United States Patent [19]

Rodriguez-Cavazos

[11] Patent Number: 4,651,214
[45] Date of Patent: Mar. 17, 1987

[54] REMOTE CONTROLLED TELEVISION RECEIVER POWER SUPPLY

[75] Inventor: Enrique Rodriguez-Cavazos, Indianapolis, Ind.

[73] Assignee: RCA Corporation, Princeton, N.J.

[21] Appl. No.: 685,722

[22] Filed: Dec. 24, 1984

[51] Int. Cl.⁴ ............................................... H04N 3/18
[52] U.S. Cl. .................................. 358/190; 358/194.1
[58] Field of Search ............................ 358/190, 194.1; 315/411; 361/54, 57; 363/21, 28, 75

[56] References Cited

U.S. PATENT DOCUMENTS

| 4,024,577 | 5/1977 | Diethelm | 358/190 |
| 4,156,168 | 5/1980 | Hicks | 358/190 |
| 4,387,324 | 6/1983 | Willis | 358/190 X |
| 4,392,070 | 7/1983 | Rinehart et al. | 358/194.1 X |
| 4,500,923 | 2/1985 | Duvall et al. | 358/190 |
| 4,532,457 | 7/1985 | Haferl | 358/190 X |

FOREIGN PATENT DOCUMENTS 3021148 12/1981 Fed. Rep. of Germany ...... 358/190

Primary Examiner—Howard W. Britton
Assistant Examiner—Victor R. Kostak
Attorney, Agent, or Firm—Eugene M. Whitacre; Paul J. Rasmussen; Joseph J. Laks

[57] ABSTRACT

A mains rectified DC input voltage is applied to a series-pass regulator to develop a regulated B+ supply voltage. To reduce dissipation in the series-pass transistor, a shunt resistor parallels the series-pass transistor. To place the remote controlled television receiver in the standby-mode of operation, a remote standby control circuit applies an on/off command signal to the horizontal deflection circuit. Operation of the horizontal deflection circuit during the off-state of the command signal is disabled, thereby disabling the flyback transformer derived voltage supplies. A thyristor is placed in series with the shunt resistor and blocks current flow to the B+ supply terminal from the input voltage terminal during standby. To resume run-mode operation, the remote standby control circuit generates the on-state of the command signal to reenable horizontal deflection circuit. Current flowing to the B+ supply terminal from the regulator series-pass transistor also flows in an inductor to induce a voltage that is coupled to the gate of the thyristor to turn on the thyristor and reconnect the shunt resistor in parallel with the series-pass transistor.

10 Claims, 1 Drawing Figure

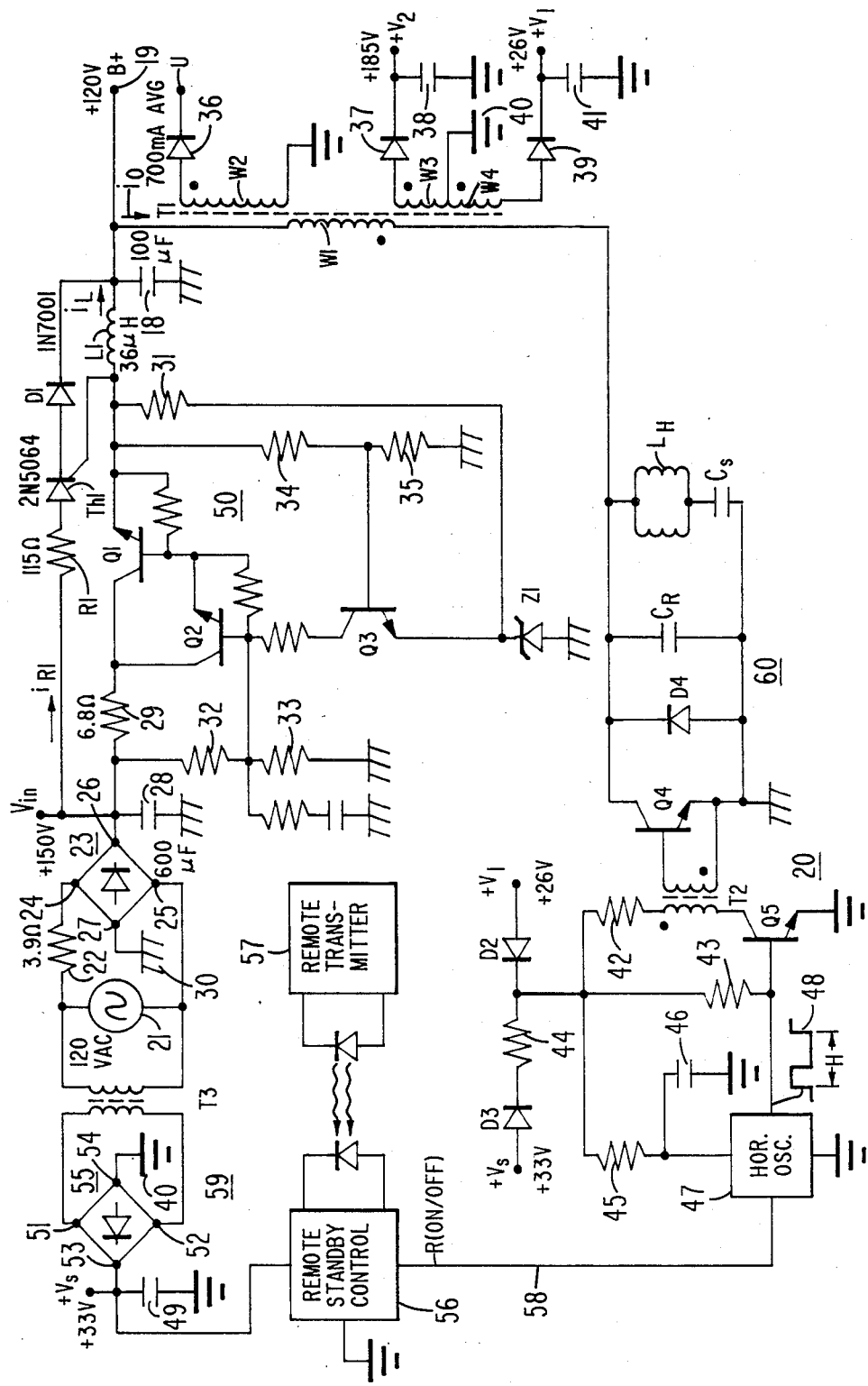

REMOTE CONTROLLED TELEVISION RECEIVER POWER SUPPLY

This invention relates to a remote controlled power supply for a television receiver.

A series-pass regulator may be used to develop a regulated B+ supply voltage from an unregulated DC input voltage. To reduce dissipation in the series-pass element, it is a typical practice to provide a shunt resistor paralleling the series-pass element to carry some of the load current that flows from the unregulated input terminal to the regulated supply terminal.

When a series-pass regulator is used in a remote controlled television receiver, on/off control of the television receiver has heretofore been accomplished by using an electromechanical relay that disconnects the regulator from the AC mains voltage source in the standby-mode of operation. Current in the relay coil is controlled by the remote standby circuit of the television receiver. In a television receiver that electrically isolates the chassis from the AC mains voltage source, the electromechanical relay is designed so as to provide electrical shock hazard isolation between the relay coil and the mechanical switch mechanism of the relay. The electromechanical relay then becomes a relatively expensive component to manufacture due to the shock hazard isolation construction of the relay.

In accordance with a feature of the invention a remote controlled television receiver power supply is provided that avoids the use of an electromechanical on/off relay for placing the television receiver in a standby operating condition. A power supply is coupled to a source of input voltage for developing a supply voltage at a supply terminal. The input voltage is available during both the on-state and the off-state of an on/off command signal. A load arrangement is coupled to the power supply and includes a line deflection circuit coupled to the aforementioned supply terminal and obtains its load current therefrom. The line deflection circuit is disabled upon the occurrence of the off-state of the command signal. The change in current provided by the power supply upon the switching from one state of the command signal to the other is sensed. The power supply is then switched from either the standby or run-mode of operation to the other mode in accordance with the state of the command signal.

In carrying out the invention, an inventive arrangement is provided wherein the power supply comprises a controllable series-pass element for providing a first current path between the input voltage source and the supply terminal and an impedance for providing a second current path between the input voltage source and the supply terminal. A current blocking element is coupled to the impedance and is responsive to the sensed current change for blocking the current flow in the second current path in the off-state of the command signal.

The sole FIGURE illustrates a remote control television receiver power supply embodying the invention.

In the television receiver circuitry of the FIGURE, a horizontal deflection circuit 20 includes a horizontal oscillator 47 generating horizontal rate switching signals 48 that are applied to the base of a horizontal driver transistor Q5 to control via a driver transformer T2 the switching of a horizontal output transistor Q4 of a horizontal output stage 60. Horizontal output stage 60 comprises horizontal output transistor Q4, a damper diode D4, a retrace capacitor $C_R$ and the series arrangement of a horizontal deflection winding $L_H$ and a trace capacitor $C_S$. One end terminal of the primary winding W1 of a flyback transformer T1 is coupled to horizontal deflection winding $L_H$ and the other end terminal is coupled to a B+ supply voltage terminal 19.

During run-mode or normal operation of the television receiver, horizontal output stage 60 develops a retrace pulse voltage that is applied to the primary winding W1 of flyback transformer T1 to develop secondary-side trace and retrace rectified DC supply voltages. For example, the voltage across a high voltage winding W2 of flyback transformer T1 is rectified during the retrace interval by a diode 36 to generate an ultor accelerating potential at a terminal U. The voltage across a secondary winding W3 is rectified during the retrace interval by a diode 37 and filtered by a capacitor 38 to develop a DC supply voltage $+V_2$ that provides power to television receiver load circuits such as the picture tube driver stage, not illustrated in the FIGURE. The voltage across a secondary winding W4 is rectified during the trace interval by a diode 39 and filtered by capacitor 41 to develop a DC supply voltage $+V_1$ that powers such television receiver load circuits as the vertical deflection circuit and the video processing circuits.

The $+V_1$ supply also provides operating current to the collector of horizontal driver transistor Q5 via a diode D2 and a resistor 42 and provides DC bias to the base of the transistor via a resistor 43. The $+V_1$ supply is also used as the supply voltage source for horizontal oscillator 47, after first being dropped in voltage level by a resistor 45 and filtered by a capacitor 46.

A regulated power supply 50 develops the regulated B+ supply voltage at terminal 19 from an unregulated DC input voltage $V_{in}$ appearing at a supply terminal 26. A capacitor 18 filters the B+ voltage.

To generate the unregulated input voltage $V_{in}$, a source 21 of AC mains voltage is coupled between input terminals 24 and 25 of a full wave bridge rectifer 23 to develop the voltage $V_{in}$ between terminal 26 of the bridge rectifier and current return terminal 27. A capacitor 28 filters the voltage $V_{in}$ and a resistor 22 coupled between AC mains voltage source 21 and bridge rectifier input terminal 24 limits surge currents.

Current return terminal 27 is designated as an earth ground 30 that is conductively connected to AC mains source 21. Earth ground 30 is electrical shock hazard isolated from chassis ground 40 and from all the television receiver load circuits that are referenced to chassis ground.

Regulated power supply 50 comprises a series-pass regulator that includes a series-pass transistor element comprising a series-pass power transistor Q1 and a transistor Q2 coupled to transistor Q1 in a Darlington configuration. The collector of series-pass transistor Q1 is coupled to supply terminal 26 via a current limiting resistor 29 and the emitter is coupled to B+ supply terminal 19 via a current sensing inductor L1. Transistor Q1 provides a first current path between unregulated voltage terminal 26 and regulated B+ voltage supply terminal 19. An impedance, resistor R1, paralleling transistor Q1, provides a second, shunt current path between terminals 26 and 19. Coupled in series with resistor R1 is a thyristor Th1 and a diode D1.

During normal, steady-state, run-mode of television receiver operation, the load circuits coupled to supply terminal 19 drain current $i_0$ from terminal 19. These load circuits include horizontal deflection circuit 20 and the load circuits coupled to the $+V_1$, $+V_2$ and ultor voltage U terminals. The input current flowing from terminal 26 to terminal 19 to maintain the B+ supply voltage regulated flows as a current $i_L$ in the first current path of transistor Q1 and inductor L1. The input current also flows as a shunt current $i_{R1}$ in the second current path that includes resistor R1, thyristor Th1 and diode D1, both of which devices are normally conductive in the run-mode of television receiver operation.

To maintain a regulated B+ supply voltage at terminal 19 when the unregulated input voltage $V_{in}$ varies in magnitude or the load current drain $i_0$ changes, the control circuit of series-pass regulator 50 varies the conduction of transistor Q1. The control circuit includes a transistor Q3 having its collector electrode coupled to the base of transistor Q2 and having its base electrode coupled to the junction terminal of a resistor 34 and a resistor 35. Resistors 34 and 35 comprise a voltage divider coupled between the emitter of transistor Q1 and earth ground. Base current for transistor Q2 is supplied from terminal 26 via a resistor 32 of voltage dividing resistors 32 and 33. The emitter electrode of transistor Q3 is biased by a zener diode Z1 that receives bias current via a resistor 31 coupled to the emitter of transistor Q1. Transistors Q1, Q2 and Q3 may be incorporated into an integrated circuit package such as STR-30123 manufactured by Sanken Electric Company, Ltd., Tokyo, Japan.

To regulate the B+ supply voltage, conduction of transistor Q1 is controlled by conduction of control transistor Q3. The B+ supply voltage is applied to the base of transistor Q3 via resistor 34. When load current $i_0$ increases or input voltage $V_{in}$ decreases, for example, the B+ supply voltage tends to decrease. The decrease in B+ supply voltage is applied to the base of control transistor Q3, making the transistor less conductive, thereby shunting less base current away from transistor Q2 to enable transistor Q1 to conduct more current to oppose the tendency of the B+ voltage to decrease.

The current drained from B+ supply terminal 19 is resupplied from terminal 26 via the first and second current paths to maintain the B+ voltage relatively constant. The current $i_L$ in the first current path through transistor Q1 and inductor L1 flows in the form of current pulsations about an average value. These pulsations typically occur at a line deflection rate and induce a voltage across inductor L1.

The current $i_{R1}$ in the second current path is essentially determined by the value of resistor R1 and the voltage applied across the resistor, which voltage equals the difference between the unregulated input voltage $V_{in}$ and the regulated B+ voltage. Resistor R1 functions to substantially decrease dissipation in series-pass transistor Q1 by providing a path for current to terminal 19 that bypasses the transistor. It may be desirable to shunt as much current as practical away from series-pass transistor Q1 to reduce dissipation in the transistor. The value of resistor R1 however should still be large enough so that the average current $i_{R1}$ is smaller than the minimum average load current drain $i_0$ at the maximum input voltage level. This permits regulator 50 to operate properly under these conditions.

To turn off operation of the television receiver, a remote transmitter unit 57 generates a coded infrared or ultrasonic signal that is received and decoded by a remote standby control circuit 56 to produce the off-state condition of a remote on/off command signal R developed on a signal line 58. Horizontal oscillator 47 is responsive to the state of command signal R, and during the off-state of the command signal stops generating switching signals 48, thereby disabling horizontal deflection circuit 20. With horizontal deflection circuit 20 disabled, the generation of deflection retrace pulse voltage in flyback transformer T1 stops. The secondary supply voltages $+V_1$, $+V_2$ and the ultor voltage at terminal U decay to zero, denergizing their associated load circuits and placing the television receiver in a standby mode of operation.

When horizontal deflection circuit 20 and the flyback transformer coupled load circuits become disabled, no significant load current $i_0$ flows from terminal 19. Shunt current $i_{R1}$ through resistor R1 and thyristor Th1 continues to flow momentarily until filter capacitor 18 charges to a voltage level substantially that of the input voltage $V_{in}$. At this point, thyristor Th1 becomes nonconductive and blocks further current flow in the shunt current path.

While filter capacitor 18 is being charged via the shunt current path, regulator control transistor Q3 responds to the increase in voltage above the B+ voltage level by cutting off conduction in transistor Q1. After thyristor Th1 becomes blocked, capacitor 18 begins to discharge to earth ground via residual current paths established through resistors 31 and 34. When capacitor 18 has discharged back to the B+ voltage level, control transistor Q3 maintains conduction in transistor Q1 at the level needed to keep the voltage at terminal 19 at the B+ voltage level, taking into account the residual current drain through resistors 31 and 34. The residual current drain is below the holding current level of thyristor Th1 and thus does not affect the blocking ability of the thyristor.

With AC mains supply source being coupled directly to bridge rectifier circuit 23, without the interposition of a mechanical on/off switch, the unregulated input voltage $V_{in}$ is available at terminal 26 during both the on-state and the off-state of remote command signal R. This results in B+ voltage being generated at terminal 19 even during the off-state of the command signal. In accordance with an aspect of the invention, by providing a current blocking thyristor Th1 in the shunt current path of resistor R1, the voltage at supply terminal 19 is prevented from staying at the elevated voltage level of the unregulated input voltage $V_{in}$ during the off-state. This elevated voltage level can be significantly greater than the regulated B+ voltage level. The blocking effect of thyristor Th1 prevents the development of an excessively large voltage level at B+ terminal 19 prior to startup of the television receiver. This avoids overstressing of horizontal output transistor Q4 at startup and avoids generating excessive flyback transformer secondary-side supply voltage stresses when the television receiver is switched back to the run-mode of operation.

A standby power supply 59 develops a low voltage DC supply voltage $+V_s$ that is available during both the standby and run-modes of television receiver operation. Standby power supply 59 comprises a transformer T3 having a primary winding coupled to mains voltage source 21 and a secondary winding coupled between input terminals 51 and 52 of a bridge rectifier 55 for developing the standby voltage $+V_s$ at an output terminal 53. A filter capacitor 49 is coupled between output terminal 53 and a current return terminal 54 of bridge rectifier 55. Current return terminal 54 is coupled to chassis ground 40, electrically isolated from earth ground 30.

The standby voltage $+V_s$ forms the supply voltage for remote standby control circuit 56 during both standby and run-modes of television receiver operation. Standby voltage $+V_s$ is also the voltage supply for horizontal oscillator 47 and horizontal driver transistor Q5 during startup, before the flyback transformer derived supply voltage $+V_1$ is developed. Standby voltage $+V_s$ is applied to horizontal oscillator 47 and horizontal driver transistor Q5 via a disconnect diode D3 and a resistor 44.

To place the television receiver in run-mode of operation, remote transmitter unit 57 generates a turn-on signal that is decoded by remote standby control circuit 56 to switch the state of command signal R to the on-state. Horizontal oscillator 47 is responsive to the on-state of command signal R and begins its oscillation to develop switching signals 48 that produce horizontal rate switching of driver transistor Q5 and horizontal rate switching of horizontal output transistor Q4. Retrace pulse voltages are developed by horizontal output stage 60 and are rectified by secondary windings W2-W4 of flyback transformer T1 to generate the supply voltages $+V_1$, $+V_2$ and the ultor voltage at terminal U.

With the resumption of horizontal deflection circuit operation, a relatively heavy load current $i_0$ flows from terminal 19 in response to the charging of the initially uncharged filter capacitors 38, 41 and the ultor capacitance associated with terminal U. The heavy load current flow from terminal 19 attempts to rapidly discharge filter capacitor 18. Series-pass regulator 50 responds to the change in voltage at B+ terminal 19 during startup and makes series-pass transistor Q1 highly conductive to enable a large current $i_L$ to flow in series-pass transistor Q1 and current sensing inductor L1.

In accordance with a feature of the invention, the relatively large current pulsations occurring in inductor L1 during startup induce a relatively large voltage across the inductor that is applied to the gate of thyristor Th1 to turn on the thyristor. With thyristor Th1 turned on, the shunt current path through resistor R1 is unblocked and shunt current $i_{R1}$ begins to flow in a normal manner. Thyristor Th1 remains conductive throughout the run-mode of television receiver operation, as long as the shunt current $i_{R1}$ is maintained above the holding or sustaining current level of the thyristor.

Diode D1 is coupled between the cathode of thyristor Th1 and the terminal of inductor L1 remote from the gate of the thyristor. Diode D1 provides an offset voltage reference that substracts from the induced voltage developed by inductor L1, resulting in a smaller gating voltage being applied between the gate and cathode electrodes of thyristor Th1 than the voltage that would have been applied had diode D1 been omitted. The offset voltage provided by diode D1 avoids unintentional gating on of thyristor Th1 by any undesirable transient voltage induced across inductor L1 during standby.

The inductance value of inductor L1 is selected to generate a sufficiently large induced voltage from the current pulsations that occur during television receiver startup to permit reliable turn-on of thyristor Th1 at startup. Optionally, as an additional margin of safety to ensure reliable run-mode television receiver operation, inductor L1 may be sized to provide adequate turn-on gating pulses to thyristor Th1 in the run-mode, even though current through the thyristor is normally well-above the holding current level.

Electrical shock hazard isolation between mains voltage source 21 and most of the television receiver circuits, such as remote standby receiver circuit 56, horizontal oscillator 47 and the flyback transformer secondary-side load circuits, is obtained by providing power and signal transfer via flyback transformer T1, driver transformer T2 and standby supply transformer T3. Relatively few television receiver circuits use earth ground 30 as a current return and reference plane, thereby conductively connecting these circuits to AC mains source 21. These circuits, however, do include horizontal output stage 60 and regulated power supply 50.

In accordance with a feature of the invention, the state of a remote on/off command signal R developed on signal line 58 that is conductively isolated from AC mains source 21 may, nevertheless, be ascertained by power supply 50 that is not so conductively isolated. The state of command signal R may be ascertained by providing a current sensing inductor L1. Inductor L1 generates an induced voltage for controlling the state of regulated power supply 50. The induced voltage is present during the on-state of command signal R and is absent during the off-state.

What is claimed:

1. A television display apparatus with on/off control, comprising:
   a source of an on/off command signal;
   a source of input voltage available during both the on-state and the off-state of said command signal;
   a power supply coupled to said voltage source for developing a supply voltage at a supply terminal;
   a load arrangement coupled to said power supply including a line deflection circuit coupled to said supply terminal and obtaining load current therefrom, said line deflection circuit being disabled upon the occurrence of the off-state of said command signal;
   means for developing a sense signal that senses the change in current being provided by said power supply upon the switching from one state of said command signal to the other state; and
   means responsive to said sense signal for switching said power supply from one of a standby and run-mode of operation to the other mode of operation in accordance with the state of said command signal.

2. Apparatus according to claim 1 wherein said sense signal developing means comprises an inductance for developing an induced sense signal voltage in accordance with current flowing therein.

3. Apparatus according to claim 1 wherein said power supply comprises a controllable series-pass element for providing a first current path between said input voltage source and said supply terminal and an impedance for providing a second current path between said input voltage source and said supply terminal and wherein said power supply switching means includes means for blocking the current flow in said second current path.

4. Apparatus according to claim 3 including a flyback transformer responsive to a line deflection retrace pulse voltage for energizing load circuits coupled to the secondary-side of said flyback transformer, and wherein said line deflection circuit is responsive to said on/off command signal to stop the generation of said deflection retrace pulse voltage upon the occurrence of the off-state of said command signal.

5. Apparatus according to claim 3 including a control circuit responsive to a voltage being developed at said supply terminal for controlling conduction of said series-pass element to regulate said supply voltage, said control circuit being operative during the off-state of said command signal to develop a voltage at said supply terminal during the off-state.

6. Apparatus according to claim 3 wherein said impedance comprises a resistor and wherein the voltage being developed thereacross during the on-state of said command signal is substantially equal to the voltage difference between said input voltage and said supply voltage.

7. Apparatus according to claim 3 wherein said blocking means comprises a thyristor.

8. Apparatus according to claim 7 wherein said sense signal developing means comprises an inductance coupled to the gate of said thyristor and wherein current pulsations in said first current path develop an induced voltage in said inductance that is applied to the gate of said thyristor.

9. Apparatus according to claim 8 including a source of offset voltage coupled to said inductance and to the cathode of said thyristor, said induced voltage being applied between the gate of said thyristor and a terminal of said offset voltage source remote from the cathode of said thyristor.

10. Apparatus according to claim 8 wherein said impedance comprises a resistor and wherein the voltage being developed thereacross during the on-state of said command signal is substantially equal to the voltage difference between said input voltage and said supply voltage.

* * * * *